US009845685B2

(12) United States Patent
Stiehler et al.

(10) Patent No.: US 9,845,685 B2
(45) Date of Patent: Dec. 19, 2017

(54) PROCESS FOR PRODUCING A RUN-IN COATING

(71) Applicant: MTU AERO ENGINES GMBH, Munich (DE)

(72) Inventors: Frank Stiehler, Bad Liebenwerda (DE); Manuel Hertter, Munich (DE)

(73) Assignee: MTU AERO ENGINES GMBH, Munich (DE)

( * ) Notice: Subject to any disclaimer, the term of this patent is extended or adjusted under 35 U.S.C. 154(b) by 969 days.

(21) Appl. No.: 13/856,235

(22) Filed: Apr. 3, 2013

(65) Prior Publication Data
US 2013/0343900 A1 Dec. 26, 2013

(30) Foreign Application Priority Data

Apr. 4, 2012 (EP) .................................... 12163066

(51) Int. Cl.
| | |
|---|---|
| *F01D 5/20* | (2006.01) |
| *F01D 5/14* | (2006.01) |
| *F01D 5/28* | (2006.01) |
| *F01D 11/12* | (2006.01) |
| *F02C 7/00* | (2006.01) |
| *F02C 7/25* | (2006.01) |

(52) U.S. Cl.
CPC .............. *F01D 5/147* (2013.01); *F01D 5/288* (2013.01); *F01D 11/122* (2013.01); *F01D 11/127* (2013.01); *F02C 7/00* (2013.01); *F02C 7/25* (2013.01); *F05D 2240/307* (2013.01)

(58) Field of Classification Search
CPC ........ F01D 5/147; F01D 5/288; F01D 11/122; F01D 11/125; F01D 11/127; F01D 11/08; F01D 11/12; F02C 7/00; F02C 7/25; F05D 2240/11; F05D 2240/15; F05D 2230/11; F05D 2230/31; F05D 2230/90; F05D 2250/283
USPC ............ 415/173.4, 173.1; 427/189, 191, 192
See application file for complete search history.

(56) References Cited

U.S. PATENT DOCUMENTS

| | | | |
|---|---|---|---|
| 4,856,963 A | 8/1989 | Klapproth et al. | |
| 6,139,263 A | 10/2000 | Klingels | |
| 2003/0082297 A1* | 5/2003 | Wolkers ................. | B23P 6/002 427/140 |
| 2006/0131815 A1 | 6/2006 | Meier | |
| 2007/0132193 A1* | 6/2007 | Wolfe ................... | F16J 15/445 277/415 |

(Continued)

FOREIGN PATENT DOCUMENTS

| | | |
|---|---|---|
| DE | 19807247 A1 | 9/1999 |
| DE | 102009018685 A1 * | 10/2010 |

(Continued)

*Primary Examiner* — Jason Shanske
*Assistant Examiner* — Kelsey Stanek
(74) *Attorney, Agent, or Firm* — Abel Law Group, LLP

(57) ABSTRACT

Disclosed is a process for producing a run-in coating (20, 24, 32, 44) on a component of a turbomachine, in particular of a gas turbine. The run-in coating is applied and produced on the component of the turbomachine by a kinetic cold gas compacting process (K3). The invention also encompasses a run-in coating for a static or rotating component of a turbomachine and a static or rotating component of a turbomachine, in particular of a gas turbine, having at least one run-in coating.

20 Claims, 3 Drawing Sheets

(56) References Cited

U.S. PATENT DOCUMENTS

| | | | | |
|---|---|---|---|---|
| 2008/0063508 A1* | 3/2008 | Barnett | ............... | F01D 11/122 |
| | | | | 415/9 |
| 2009/0041610 A1* | 2/2009 | Meier | ............... | F01D 11/127 |
| | | | | 419/26 |
| 2010/0143103 A1* | 6/2010 | Sellars | ............... | F16J 15/445 |
| | | | | 415/173.4 |
| 2011/0014055 A1* | 1/2011 | Hertter | ............... | C23C 24/04 |
| | | | | 416/223 A |
| 2012/0034092 A1* | 2/2012 | Jakimov | ............... | C23C 4/08 |
| | | | | 416/229 A |
| 2012/0107103 A1* | 5/2012 | Kojima | ............... | F01D 11/122 |
| | | | | 415/173.4 |
| 2012/0121431 A1* | 5/2012 | Jakimov | ............... | C23C 24/04 |
| | | | | 416/241 R |
| 2012/0145371 A1* | 6/2012 | Bunker | ............... | F01D 5/147 |
| | | | | 165/177 |

FOREIGN PATENT DOCUMENTS

| | | | | | |
|---|---|---|---|---|---|
| DE | 102009036407 | A1 * | 2/2011 | ............ | C23C 24/04 |
| WO | 2004061340 | A1 | 7/2004 | | |
| WO | 2011141017 | A1 | 11/2011 | | |

* cited by examiner

PROCESS FOR PRODUCING A RUN-IN COATING

CROSS-REFERENCE TO RELATED APPLICATIONS

The present application claims priority under 35 U.S.C. §119 of European Patent Application No. 12163066.9, filed Apr. 4, 2012, the entire disclosure of which is expressly incorporated by reference herein.

BACKGROUND OF THE INVENTION

1. Field of the Invention

The invention relates to a process for producing a run-in coating on a component of a turbomachine, in particular of a gas turbine. The invention also relates to a correspondingly produced run-in coating and to a static or rotating component of a turbomachine having such a run-in coating.

2. Discussion of Background Information

Run-in coatings are used in particular in so-called gap retention systems in the compressor components and turbine components of turbomachines. In this case, the run-in coatings have the task of keeping a sealing gap between a rotating blade arrangement and a housing and also the gaps between a stationary blade arrangement and the rotating rotor hubs to a minimum, and therefore of guaranteeing a stable operating behavior of the turbomachine with a high level of efficiency. In this respect, the rotating components of the turbine usually have sealing fins, which, as is known, run in against the run-in coatings or seals. A honeycomb-shaped seal of this type is disclosed by WO 2004/061340 A1, the entire disclosure of which is incorporated by reference herein. It is known to join run-in coatings to the corresponding compressor components or turbine components by means of mechanical fastening means, by means of soldering, welding or laser welding. Furthermore, it is known to apply the run-in coatings directly to the compressor components or turbine components by means of generative production processes or thermal spraying processes. The known fastening or application processes have the disadvantage, however, that a sufficiently high bond strength cannot always be achieved between the run-in coating and the compressor component or turbine component.

SUMMARY OF THE INVENTION

It is an object of the present invention to provide a process for producing a run-in coating on a component of a turbomachine which ensures a secure bond between the component surface and the run-in coating and in addition can be carried out at low cost. It is furthermore an object of the present invention to provide a corresponding run-in coating and a component of a turbomachine having such a run-in coating.

The present invention provides a run-in coating on a static or rotating component of a turbomachine such as, e.g., a gas turbine. The run-in coating is applied and produced on the component of the turbomachine by a kinetic cold gas compacting process (K3).

In one aspect of the process, at least one bonding layer and/or at least one thermal barrier layer or titanium fire protection layer may be applied to a surface of the static or rotating component to be coated with the run-in coating prior to applying the run-in coating to form a composite run-in coating. For example, the at least one bonding layer and/or at least one thermal barrier layer or titanium fire protection layer may be produced by a thermal spraying process such as, e.g., a kinetic cold gas compacting process (K3).

In another aspect of the process of the present invention, a structure and/or a contour may be formed on and/or in the run-in coating after application of the run-in coating to the static or rotating component. For example, the structure and/or contour may be formed by an electrochemical material removal process such as, e.g., electrochemical machining (ECM) and/or precise/pulsed electrochemical metal machining (PEM/PECM), or the structure and/or contour may be formed by a mechanical material removal process such as, e.g., drilling and/or milling. Further, the structure may be formed like a honeycomb In yet another aspect of the process of the present invention, the run-in coating may be applied to the static or rotating component according to a predetermined layer pattern to form a structure and/or a contour on and/or in the run-in coating. For example, the structure may be formed like a honeycomb.

The present invention also provides a run-in coating for a static or rotating component of a turbomachine such as, e.g., a gas turbine, that is produced by the process of the present invention as set forth above (including the various aspects thereof).

The present invention also provides a static or rotating component of a turbomachine such as, e.g., a gas turbine, which component comprises a run-in coating that has been produced by the process of the present invention as set forth above (including the various aspects thereof). For example, the component may be a rotor blade tip, an outer shroud of a rotor blade or a row of rotor blades, or a housing of a compressor component or turbine component.

A process according to the invention for producing a run-in coating on a component of a turbomachine, in particular of a gas turbine, is distinguished by the fact that the run-in coating is applied and produced on the component of the turbomachine by a kinetic cold gas compacting process (K3), the component being a static or rotating component of the turbomachine. A reliable join between the component of the turbomachine and the run-in coating is provided by the use according to the invention of a kinetic cold gas compacting process. Specifically, very dense layers which bond very well and firmly to the corresponding component surfaces are formed by the high particle velocities used during the kinetic cold gas compacting process. In addition, the use of the kinetic cold gas compacting process avoids an often undesirable excessively porous material application, as can result in other thermal spraying processes, such as plasma spraying, flame spraying and high-velocity flame spraying, owing to the strong turbulences with the ambient air during the application and the production of run-in coatings.

The pulverulent starting materials used in the process according to the invention for producing the run-in coatings are materials commonly used for run-in coatings. Use may be made in particular of suitable metal powders or metal powder/ceramic powder mixtures. In particular, aluminum alloys may be used for producing run-in coatings for turbomachines. Furthermore, it is also possible to use suitable plastics. Moreover, inert fillers of readily cleavable materials, such as graphite, bentonite or hexagonal boron nitride, can be added to these base materials. Other suitable materials or material combinations are also conceivable, but these have to be deformable for use in the kinetic cold gas compacting process.

In further advantageous configurations of the process according to the invention, before the run-in coating is applied, at least one bonding layer and/or at least one thermal barrier layer or titanium fire protection layer is applied to a surface of the static or rotating component which is to be coated with the run-in coating to form a composite run-in coating. In this case, the bonding layer and/or thermal barrier layer or titanium fire protection layer can be produced by means of a thermal spraying process. In particular, in this respect again a kinetic cold gas compacting process can be used, as a result of which the composite run-in coating can advantageously be produced at a spraying apparatus. It is also possible, however, for the bonding layer and/or thermal barrier layer or titanium fire protection layer to be applied initially by means of, for example, flame spraying, high-velocity flame spraying, arc spraying and/or plasma spraying.

In further advantageous configurations of the process according to the invention, after the run-in coating has been applied to the static or rotating component, a structure and/or contour can be formed on and/or in the run-in coating. The structures and/or the contours serve in this case to improve the aerodynamics of the run-in coating. Here, the structure and/or contour can be formed by means of an electrochemical material removal process, in particular electrochemical machining (ECM) or precise/pulsed electrochemical metal machining (PEM/PECM), or a mechanical material removal process, in particular drilling or milling. It is also possible, however, for the run-in coating to be applied to the static or rotating component according to a predetermined layer pattern to form a structure and/or contour on and/or in the run-in coating. Thus, it is possible for example to use a preprogrammed layer pattern by means of a corresponding computer-controlled application and spraying apparatus to form the run-in coating. It is also possible, however, to cover regions of the static or rotating component which are not to be coated with the run-in coating by means of suitable materials in a known manner before the pulverulent material is applied. The structure can in this respect be formed like a honeycomb. The application and the production of the run-in coating by means of the kinetic cold gas compacting process is independent of the surface of the component to which the run-in coating is applied. As a result of this, surface-independent structures and/or contours can advantageously be worked into and/or onto the run-in coating.

Furthermore, the process according to the invention for producing the run-in coating by means of the kinetic cold gas compacting process is inexpensive and can therefore also be used readily in series production.

The invention furthermore provides a run-in coating for a static or rotating component of a turbomachine, in particular of a gas turbine, produced by a process described hereinabove. The run-in coating according to the invention is bonded reliably to the component surface of the static or rotating component and can be produced cost-effectively.

Furthermore, the invention provides a static or rotating component of a turbomachine, in particular of a gas turbine, having at least one run-in coating produced by a process described hereinabove. The use of the kinetic cold gas compacting process for applying and producing the run-in coating gives rise to an integral structure between the static or rotating component and the run-in coating. In addition, a reliable join is produced between the run-in coating and the component.

Further configurations and advantages of the run-in coating according to the invention and of the component according to the invention have been described hereinabove.

Further features of the invention become apparent from the claims, the exemplary embodiments and also with reference to the drawings. The features and combinations of features given above in the description and also the features and combinations of features given below in the exemplary embodiments can be used not only in the combination indicated in each case, but also in other combinations, without departing from the scope of the invention.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
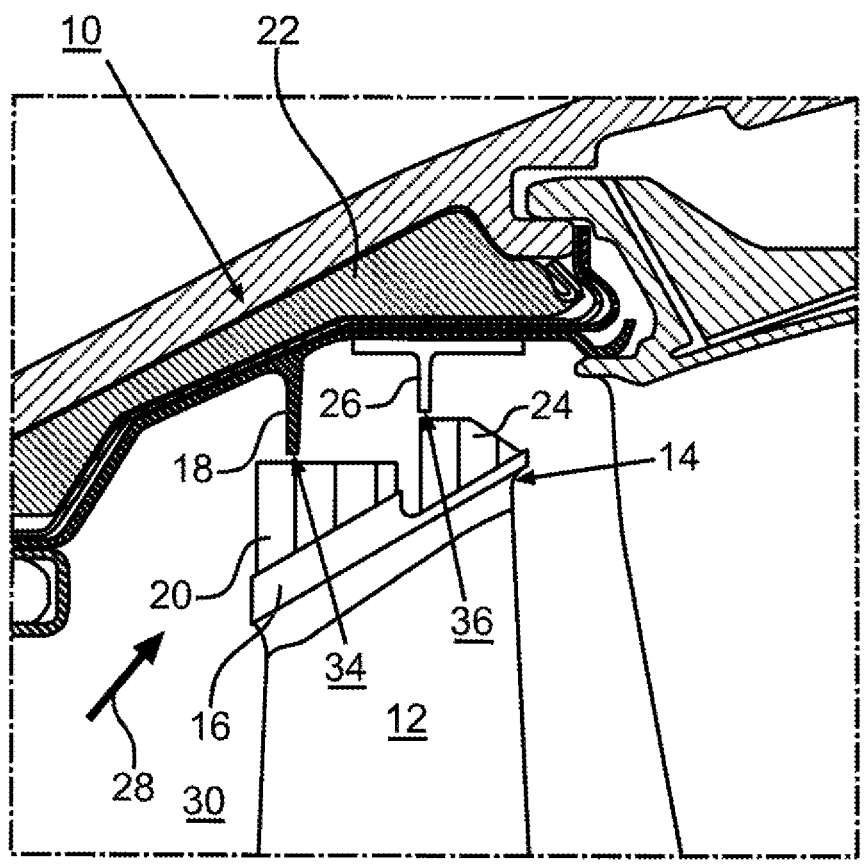
FIG. 1 shows a schematic and sectional view of a run-in coating according to the invention within a region of a turbomachine according to a first embodiment.

The run-in coatings 20, 24 shown in FIG. 1 are part of a seal system 10 as a component part of a low-pressure gas turbine. It is recognized that the seal system 10 is arranged in an annular space 30 between a flow-limiting wall 22 of the low-pressure gas turbine and a row of rotor blades comprising a plurality of rotor blades 12 or an outer shroud 16 arranged on a rotor blade tip 14. The seal system 10 here comprises two sealing points 34, 36, the second sealing point 36 being arranged downstream of the first sealing point 34 in the direction of flow 28. The sealing points 34, 36 here consist of in each case a run-in coating 20, 24 arranged on the outer shroud 16 and of in each case a sealing tip 18, 26 which lies opposite the respective run-in coating 20, 24 and is arranged on the inner side of the wall 22. In addition, the run-in coatings 20, 24 are arranged in succession in the direction of flow 28. The run-in coatings 20, 24 have in this case been applied and produced on the corresponding surfaces of the outer shroud 16 by means of a kinetic cold gas compacting process (K3). In the exemplary embodiment shown, the run-in coatings 20, 24 have a honeycomb structure, which has been worked into the run-in coatings 20, 24 after they have been applied. The structure and/or contour can in this case be formed by means of an electrochemical material removal process, in particular electrochemical machining (ECM) or precise/pulsed electrochemical metal machining (PEM/PECM), or a mechanical material removal process, in particular drilling or milling. It is also possible, however, for the run-in coating to be applied to the static or rotating component according to a predetermined layer pattern to form the structure and/or contour on and/or in the run-in coating. Thus, it is possible for example to use a preprogrammed layer pattern by means of a corresponding computer-controlled application apparatus to form the run-in coating. It is also possible, however, to cover regions of the static or rotating component of the turbomachine which are not to be coated with the run-in coating by means of suitable materials in a known manner.

The run-in coatings 20, 24 can consist of commonly used materials. For this purpose, a multiplicity of materials are known, the use of which depends on the predefined regions of use. Metallic materials are used in particular as pulverulent starting materials for the run-in coatings to be produced. To some extent, these can also be combined with ceramic materials, where these serve in particular as inert fillers for the run-in coating. Aluminum alloys are used in particular as metallic materials. It is also possible, however, for use to be made of correspondingly suitable plastics, which in particular have to withstand the operating temperatures which prevail in the various regions of the turbomachine. Furthermore, inert fillers of readily cleavable materials, for example graphite, bentonite, hexagonal boron nitride, fibers or constituents of polyester, can be integrated into the metallic sprayed layers of the run-in coating. This makes it possible to realize a correspondingly simple run in which protects materials.

Figure 2:
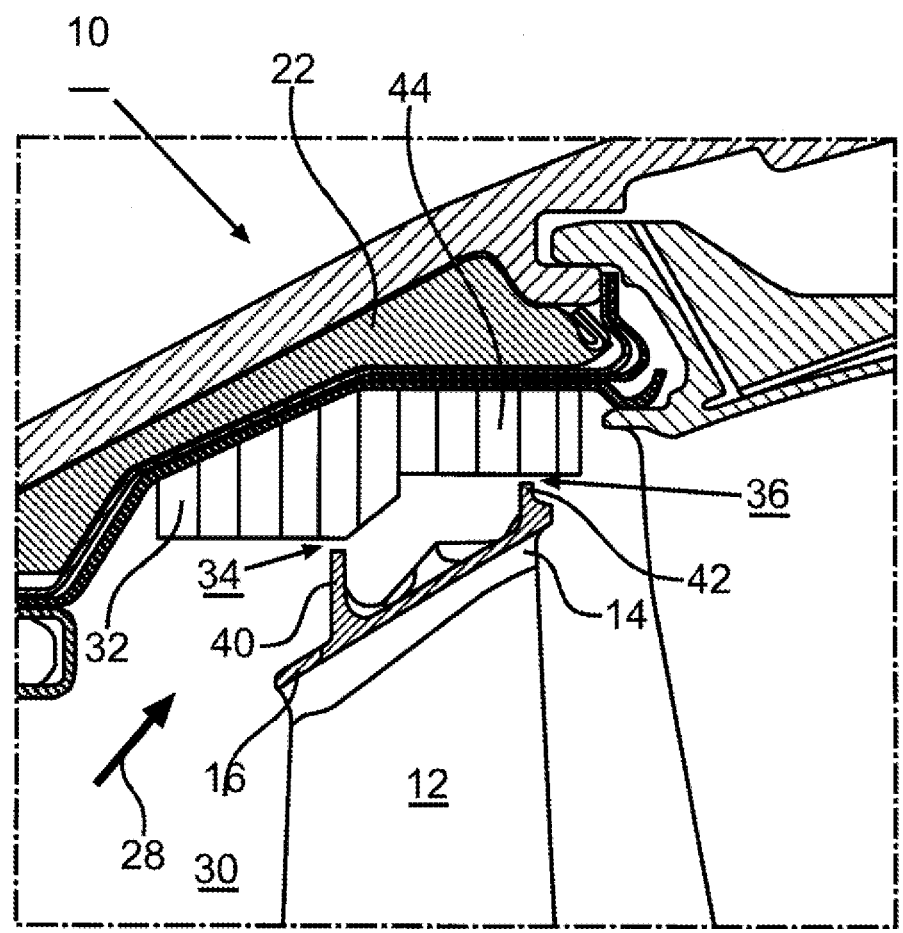
FIG. 2 shows a schematic and sectional view of a run-in coating according to the invention within a region of a turbomachine according to a second embodiment.

FIG. 2 shows a schematic and partially sectional view of sections of a seal system 10 according to a second embodiment. It is recognized that the seal system 10 is arranged in turn in the annular space 30 between the flow-limiting wall 22 of a low-pressure gas turbine and a row of rotor blades comprising a plurality of rotor blades 12 or the outer shroud 16 arranged on the rotor blade tip 14. In this exemplary embodiment, too, the seal system 10 comprises two sealing points 34, 36, the second sealing point 36 being arranged downstream of the first sealing point 34 in the direction of flow 28. In contrast to the first embodiment of the seal system as shown in FIG. 1, the first sealing point 34 comprises a sealing tip 40 arranged on the outer shroud 16, the sealing tip 40 being arranged lying opposite a run-in coating 32 arranged on an inner side of the flow-limiting wall 22. The second sealing point 36 has on the outer shroud 16 a sealing tip 42, which is arranged lying opposite a run-in coating 44 arranged on the inner side of the wall 22.

The run-in coatings shown in the exemplary embodiments are not limited to the field of low-pressure gas turbines. Instead, they can also be used in the field of compressors for lining the corresponding inner sides of the compressor housing which lie opposite the rotor blades of the compressor.

Figure 3:
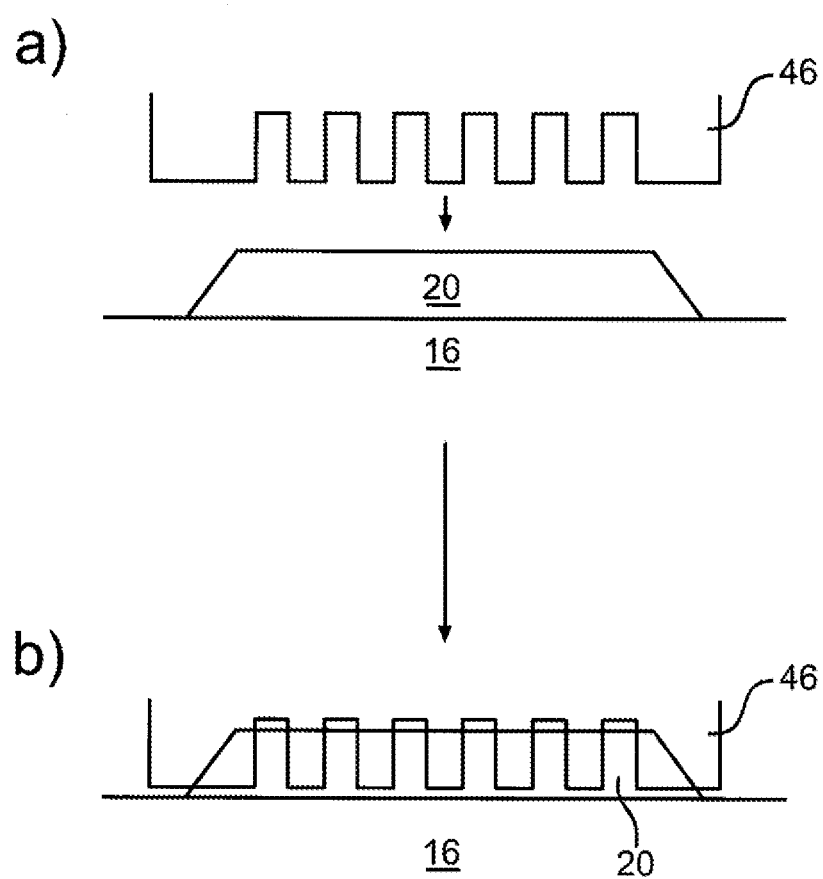
FIG. 3 shows a schematically illustrated process step for producing a structure in and/or on the run-in coating according to the invention.

FIG. 3 shows a run-in coating 20 which has been applied and produced by the kinetic cold gas compacting process. Here, the run-in coating 20 was applied to a rotating component of a turbomachine, specifically the outer shroud 16 of the rotor blade 12 of a low-pressure gas turbine. It can be seen that a tool 46 for electrochemical material removal, in particular a corresponding electrode arrangement, is lowered onto the run-in coating 20 (substeps a) and b)). The structure and shaping of the tool 46 are geared to the structure to be produced in the run-in coating 20. FIG. 3, subsection b) schematically shows the production of said structure in the run-in coating 20. It can be seen that the tool 46 is lowered onto the run-in coating 20 and penetrates into it. What is termed electrochemical machining is shown here by way of example. Here, the surface of the workpiece, in this case of the run-in coating 20, is generally machined with an electrode during the electrochemical machining, with material being removed on the run-in coating 20 by the electrochemical reaction of the workpiece or of the run-in coating 20 with the electrolyte located between the run-in coating 20 and the tool 46. In these so-called ECM, PEM or PECM processes, the width of the working gap between the electrode or the tool 46 and the workpiece or the run-in coating 20 is of considerable importance. Here, for producing relatively fine structures and shapes, the spacing can be reduced to magnitudes in the range of 10 to 50 μm and less. In order to make it possible to ensure a correspondingly sufficiently large exchange of the electrolyte given such small spacings, the tool 46 or the electrode arrangement is usually made to vibrate here.

After appropriate structuring and/or contouring of the run-in coating 20, the tool 46 is removed from the run-in coating 20 again.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The entire disclosure of the co-pending application entitled "SEALING SYSTEM FOR A TURBOMACHINE" Ser. No. 13/856,243, filed on even date herewith, is incorporated by reference herein in its entirety.

What is claimed is:

1. A process for producing a run-in coating on a static or rotating component of a turbomachine, wherein the run-in coating is applied and produced on the component by a kinetic cold gas compacting process (K3) and is applied to the component according to a predetermined layer pattern to form at least one of a structure and a contour at least one of on and in the run-in coating.

2. The process of claim 1, wherein a honeycomb structure is formed as the at least one of a structure and a contour at least one of on and in the run-in coating.

3. The process of claim 1, wherein prior to applying the run-in coating at least one of a bonding layer, a thermal barrier layer, or a titanium fire protection layer is applied to a surface of the component to be coated with the run-in coating to form a composite run-in coating.

4. The process of claim 3, wherein the at least one of a bonding layer, thermal barrier layer, or titanium fire protection layer is produced by a thermal spraying process.

5. The process of claim 1, wherein the run-in coating comprises an aluminum alloy.

6. A run-in coating for a static or rotating component of a turbomachine, wherein the coating is produced by the process of claim 1.

7. A static or rotating component of a turbomachine, wherein the component is a rotor blade tip, an outer shroud of a rotor blade or of a row of rotor blades, or a housing of a compressor component or turbine component and comprises the run-in coating of claim 6.

8. A process for producing a run-in coating on a static or rotating component of a turbomachine, wherein the run-in coating is applied and produced on the component by a kinetic cold gas compacting process (K3) and after application of the run-in coating to the component at least one of a structure and a contour is formed at least one of on and in the run-in coating by an electrochemical material removal process.

9. The process of claim 8, wherein the electrochemical material removal process comprises at least one of electrochemical machining (ECM) and precise/pulsed electrochemical metal machining (PEM/PECM).

10. The process of claim 8, wherein the run-in coating comprises an aluminum alloy.

11. A run-in coating for a static or rotating component of a turbomachine, wherein the coating is produced by the process of claim 8.

12. A static or rotating component of a turbomachine, wherein the component is a rotor blade tip, an outer shroud of a rotor blade or of a row of rotor blades, or a housing of a compressor component or turbine component and comprises the run-in coating of claim 11.

13. A process for producing a run-in coating on a static or rotating component of a turbomachine, wherein the run-in coating is applied and produced on the component by a kinetic cold gas compacting process (K3) and wherein after application of the run-in coating to the component a honeycomb structure is formed at least one of on and in the run-in coating.

14. The process of claim 13, wherein the honeycomb structure is formed by an electrochemical material removal process.

15. The process of claim 14, wherein the electrochemical material removal process comprises at least one of electrochemical machining (ECM) and precise/pulsed electrochemical metal machining (PEM/PECM).

16. The process of claim 13, wherein the honeycomb structure is formed by a mechanical material removal process.

17. The process of claim 16, wherein the mechanical material removal process comprises drilling.

18. The process of claim 13, wherein the run-in coating comprises an aluminum alloy.

19. A run-in coating for a static or rotating component of a turbomachine, wherein the coating is produced by the process of claim 13.

20. A static or rotating component of a turbomachine, wherein the component is a rotor blade tip, an outer shroud of a rotor blade or of a row of rotor blades, or a housing of a compressor component or turbine component and comprises the run-in coating of claim 19.

* * * * *